United States Patent
Mohwinkel et al.

(10) Patent No.: US 12,372,130 B2
(45) Date of Patent: Jul. 29, 2025

(54) BRAKE DISC FOR A FRICTION BRAKE OF A TRANSPORTATION VEHICLE AND METHOD OF MANUFACTURING THE SAME

(71) Applicant: VOLKSWAGEN AKTIENGESELLSCHAFT, Wolfsburg (DE)

(72) Inventors: Daniel Mohwinkel, Braunschweig (DE); Markus Harke, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 468 days.

(21) Appl. No.: 18/068,546

(22) Filed: Dec. 20, 2022

(65) Prior Publication Data

US 2023/0193968 A1 Jun. 22, 2023

(30) Foreign Application Priority Data

Dec. 22, 2021 (DE) ...................... 10 2021 214 946.4

(51) Int. Cl.
*F16D 65/12* (2006.01)
*F16D 69/04* (2006.01)

(52) U.S. Cl.
CPC ......... *F16D 65/127* (2013.01); *F16D 65/125* (2013.01); *F16D 65/123* (2013.01);
(Continued)

(58) Field of Classification Search
CPC ............................................ F16D 65/123–128
(Continued)

(56) References Cited

U.S. PATENT DOCUMENTS 10,260,585 B2 4/2019 Saga et al.
11,725,704 B2 * 8/2023 Rettig ..................... C22C 38/42
188/218 XL
(Continued)

FOREIGN PATENT DOCUMENTS

CN 205745015 U 11/2016
DE 102011089908 A1 6/2013
(Continued)

OTHER PUBLICATIONS

Office Action; Korean Patent Application No. 10-2022-0178292; Feb. 20, 2025.

*Primary Examiner* — Christopher P Schwartz
(74) *Attorney, Agent, or Firm* — Barnes & Thornburg LLP

(57) ABSTRACT

A brake disc for a friction brake of a transportation vehicle includes a friction portion having at least one friction surface and a fastening portion for fastening to the transportation vehicle, wherein the friction portion and the fastening portion are formed on a base body of gray cast iron or steel, and an anti-wear layer is applied to the friction portion as the friction surface by laser deposition welding. The anti-wear layer on the base body is continued beyond the friction surface into a region that is angled relative to the friction surface, and ends in that region, and is applied in the angled region of the base body with full coverage and without any gaps to the base body. Surface portions outside of the friction surface are provided with an anti-corrosion layer which overlaps the anti-wear layer in the angled region.

14 Claims, 4 Drawing Sheets

(52) U.S. Cl.
CPC .......... *F16D 69/04* (2013.01); *F16D 69/0408* (2013.01); *F16D 2069/0458* (2013.01); *F16D 2069/0491* (2013.01); *F16D 2200/0013* (2013.01); *F16D 2200/0021* (2013.01); *F16D 2250/0076* (2013.01)

(58) Field of Classification Search
USPC .................................................. 188/218 XL
See application file for complete search history.

(56) References Cited

U.S. PATENT DOCUMENTS

| | | | | |
|---|---|---|---|---|
| 2008/0131621 A1* | 6/2008 | Lineton | ................... | C23C 24/10 427/556 |
| 2009/0026025 A1* | 1/2009 | Hampton | .............. | F16D 65/127 188/218 XL |
| 2013/0161132 A1* | 6/2013 | Dupuis | ................... | F16D 65/12 188/1.11 W |
| 2016/0215839 A1* | 7/2016 | Bruggen | ................... | C23C 2/04 |
| 2016/0290423 A1* | 10/2016 | Tironi | ..................... | C23C 4/129 |
| 2017/0122392 A1* | 5/2017 | Lembach | ................ | F16D 69/04 |
| 2018/0180125 A1* | 6/2018 | Hollis | ..................... | C23C 24/04 |
| 2019/0085922 A1 | 3/2019 | Ketteler et al. | | |
| 2020/0378459 A1* | 12/2020 | Carminati | ............... | F16D 65/12 |
| 2020/0408267 A1 | 12/2020 | Dunlap, III et al. | | |
| 2022/0221015 A1 | 7/2022 | Potapenko et al. | | |

FOREIGN PATENT DOCUMENTS

| | | | | |
|---|---|---|---|---|
| DE | 102013213790 A1 | 6/2015 | | |
| DE | 102019213461 B3 | 8/2020 | | |
| DE | 102019204407 A1 * | 10/2020 | ............ | F16D 65/12 |
| EP | 3971440 A1 | 3/2022 | | |
| KR | 20160032273 A | 3/2016 | | |
| WO | 2007043961 A1 | 4/2007 | | |
| WO | 2020234144 A1 | 11/2020 | | |
| WO | 2021008744 A1 | 1/2021 | | |
| WO | 2021069695 A1 | 4/2021 | | |

* cited by examiner

BRAKE DISC FOR A FRICTION BRAKE OF A TRANSPORTATION VEHICLE AND METHOD OF MANUFACTURING THE SAME

PRIORITY CLAIM

This patent application claims priority to German Patent Application No. 10 2021 214 946.4, filed 22 Dec. 2021, the disclosure of which is incorporated herein by reference in its entirety.

SUMMARY

Illustrative embodiments relate to a brake disc for a friction brake of a transportation vehicle, comprising a friction portion having at least one friction surface, and a fastening portion for fastening to the transportation vehicle, wherein the friction portion and the fastening portion are formed on a base body of gray cast iron or steel, and an anti-wear layer is applied to the friction portion as the friction surface by laser deposition welding.

Illustrative embodiments further relate to a method for producing a brake disc for a friction brake of a transportation vehicle, comprising providing a base body of gray cast iron or steel which extends over a friction portion having at least one friction surface and a fastening portion for fastening to the transportation vehicle, and applying an anti-wear layer at least in the region of the friction surface by laser deposition welding.

BRIEF DESCRIPTION OF THE DRAWINGS

Disclosed embodiments are explained in greater detail below with reference to the drawing, in which.

DETAILED DESCRIPTION

Figure 1:
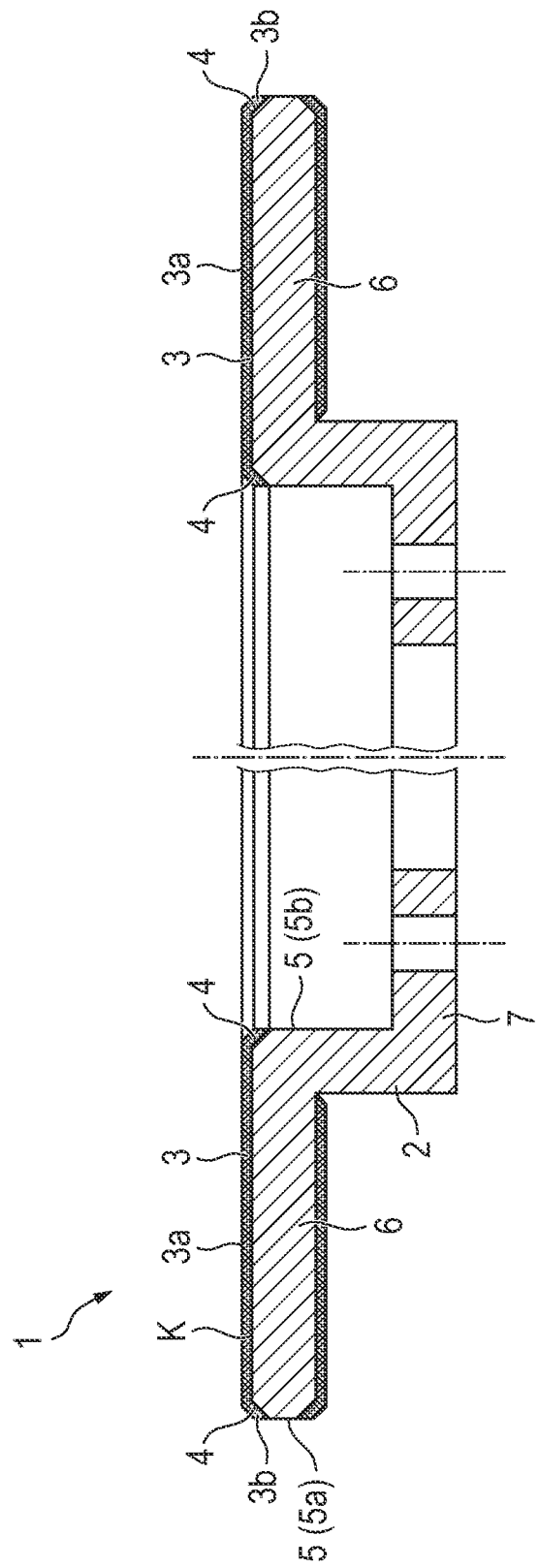
FIG. 1 is a schematic view of a brake disc in section according to an exemplary embodiment.

Brake discs are conventionally produced from gray cast iron. Gray cast iron is distinguished by a high volumetric heat capacity and good resistance to thermal shock. Moreover, it is inexpensive as a material, and the manufacture of brake discs from gray cast iron is readily controllable. However, the high tendency to corrosion and the high wear of the material during operation of the transportation vehicle are problematic. Corrosion leads to visual defects, because red rust can form after only a very short time and is directly visible owing to the open wheel rims that are frequently used. In the case of an economical driving style or in the case of electric and hybrid vehicles with large regenerative components, the high tendency of the material to corrosion can lead to pronounced surface deterioration because of infrequent braking, which requires premature replacement of the brake disc.

Ceramic brake discs are also known, but, although they have a long service life and excellent stability, they have hitherto not been able to become established for large-scale use owing to their very high price. As an alternative, it has already been proposed to provide a gray cast iron base body with an anti-wear layer in the region of the friction surfaces. Such solutions likewise achieve a significantly longer service life and greater stability compared to pure gray cast iron brake discs, but are significantly inexpensive ceramic brake discs.

By contrast, pure anti-corrosion layers such as temporary paint, zinc or powder coatings are unsuitable for this purpose because they will rub off the friction surface during the first braking operations and are unable to develop any long-lasting corrosion protection there. Such anti-corrosion layers are suitable especially for protecting portions of a brake disc that are not subject to friction and optionally also for temporarily preserving an attractive surface impression of the friction surface on delivery of new transportation vehicles.

A generic brake disc having an anti-wear layer and a generic production method therefor are known, for example, from WO 2020/234144 A1 and WO 2021/008744 A.

In conventional brake discs of this type, the interface between the anti-wear layer, which can be, for example, a non-oxide ceramic material or a metal alloy with increased wear resistance compared to the base body material, and the base body, optionally also one or more intermediate layers thereon, is exposed to the environment and therefore susceptible to corrosion. This can lead to delamination of the anti-wear layer at the inside edge and outside edge of the friction surface. It has been shown that especially the outside edge of the friction surface is affected, presumably because water drops can accumulate there particularly easily in the installed position of the brake disc.

Conventional anti-corrosion layers are not suitable for permanently preventing crevice corrosion completely in this region, also because of its proximity to the friction surface. Thus, a sacrificial coating with a zinc alloy offers only temporary protection, because the zinc, as the basest component, dissolves first. Paints are suitable for keeping a corrosive medium away from a deposition-welded anti-wear layer and the base body. However, paints are shock-sensitive and the layers tend to chip off locally, for example, in the case of stone impacts. As soon as the deposition-welded anti-wear layer or the base body is exposed as a result of a paint layer chipping off, increased corrosive attack occurs, because the surface conditions are very unfavorable for the corrosion speed. A significantly more rapid and more aggressive corrosive attack thus occurs. There is therefore no permanent anti-corrosion action in this case either.

The disclosed embodiments provide a remedy here. In particular, the aim of the disclosed embodiments is to further increase the service life in the case of brake discs having an anti-wear layer applied by laser deposition welding.

This is achieved by a brake disc. Such a brake disc is distinguished in that the anti-wear layer on the base body is continued beyond the friction surface into a region that is angled relative to the friction surface, and ends in that region, and the anti-wear layer is applied in the angled region of the base body with full coverage and without any gaps to the base body. Although the anti-wear layer ends in this region, the susceptibility to corrosion is thereby reduced significantly because the point at which a corrosive attack can now occur is at a significant distance from the friction surface. Any corrosion at the end of the anti-wear layer thus no longer impairs in a functionally relevant region the bond between the anti-wear layer and the material of the base body or optionally additional layers arranged therebetween for the purpose of adhesion promotion or the like. The service life of the disclosed brake disc having an anti-wear layer is lengthened considerably in this way.

Thus, it can be provided that there is a contact plane at the friction surface between the anti-wear layer and the substrate thereof on the base body side, and the anti-wear layer continuing into the angled region seals the edge of that contact plane. The path of a corrosive attack that breaks through to the region of the friction surface is thus made significantly longer, and the service life of the brake disc is thereby increased further.

According to a further disclosed embodiment, the friction surface merges directly or by way of a chamfer into a circumferential portion perpendicular to the friction surface. The anti-wear layer, starting from the friction surface, is thereby continued uninterruptedly into the chamfer or into the circumferential portion. The anti-wear layer can end in the region of the chamfer or in the region of the circumferential portion.

The layer thickness in the angled region may correspond approximately to the layer thickness at the friction surface, so that, in the deposition welding, it is possible to work with approximately identical welding parameters in both regions and the anti-wear layer can be applied uninterruptedly over the friction surface and the angled region. Optionally, the layer thickness of the anti-wear layer in the angled region is from 80 to 120% of the layer thickness at the friction surface, in each case measured perpendicular to the respective substrate.

According to a further disclosed embodiment, the anti-wear layer can have an edge portion in the angled region, wherein the layer thickness of the edge portion diminishes in a tapering style to the edge of the anti-wear layer.

According to a further disclosed embodiment there is additionally provided an anti-corrosion layer, in particular, of the type discussed at the beginning, which extends over the anti-wear layer at least in the angled region and further over surface portions of the brake disc outside of the anti-wear layer. A corrosive attack at the interface is thereby delayed and the service life of the brake disc is increased further. It is a benefit, therefor, that the edge of the anti-wear layer is at a significant distance from the friction surface and is thus not impaired by braking operations. The anti-corrosion layer can also be applied over the friction surface during manufacture, because this facilitates application. However, the anti-corrosion layer is worn away within a few braking operations in the region of the friction surface. It remains only in those regions which are not gripped by the brake shoes of the friction brake, where it develops its protective action against corrosion.

In at least one exemplary embodiment, the anti-wear layer is bonded directly to the material of the base body by substance-to-substance bonding. In contrast to thermal spraying methods such as, for example, flame spraying, the material of the base body is melted slightly by the laser deposition welding, so that a particularly intimate bond is obtained. A surface pre-treatment as in thermal spraying methods, in which only a mechanical bond is formed, can be omitted in the case of laser deposition welding. Laser deposition welding permits a single-layer structure of the wear protection directly on the material of the base body.

In a further exemplary embodiment, a two- or multi-layer structure is provided for the wear protection. The anti-wear layer is thereby applied to at least one intermediate layer, which in turn is bonded to the material of the base body by substance-to-substance bonding by laser deposition welding.

The above is further achieved by a method for producing a brake disc for a friction brake of a transportation vehicle. The method comprises providing a base body of gray cast iron or steel, which extends over a friction portion having at least one friction surface and a fastening portion for fastening to the transportation vehicle, and applying an anti-wear layer at least in the region of the friction surface by laser deposition welding by a welding head. The method is distinguished in that, on reaching an edge of the friction surface, the welding beam is tilted to continue the deposition welding beyond the friction surface into a region of the brake disc that is angled relative to the friction surface, wherein the distance of the welding head from the respective surface is kept the same.

A brake disc of the type described above which has a long service life, in particular, high resistance to corrosion-related damage to the adhesion of the anti-wear layer, can thereby be produced comparatively simply and inexpensively.

Thus, for example, during the deposition welding, the brake disc can be rotated in the plane of the friction surface, while the welding head is moved radially relative to the brake disc. A deposition welding bead of spiral form can thereby be produced around the axis of rotation, the turns of which bead overlap significantly, optionally by from 70 to 95%, to achieve a homogeneous layer thickness. Such a process can be continued, in particular, also continuously, beyond the edge of the friction surface to efficiently to reach a chamfer and/or a circumferential portion of the brake disc perpendicular to the friction surface.

According to a disclosed embodiment of the method, the anti-wear layer is applied by a laser powder deposition welding process. The base body, optionally also an intermediate layer already applied thereto, is thereby melted locally by a laser beam, and a powder material is introduced into the melt. Depending on the nature of the material of the powder, the powder can also be melted thereby. The region angled relative to the friction surface can easily be reached by a laser welding head, and comparable welding parameters can be maintained for both regions. In particular, the distance of the welding head from the respective surface can be kept the same.

However, other deposition welding processes are in principle also possible, as are described, for example, in WO 2020/234144 A1 and WO 2021/008744 A. The relevant content from these specifications is hereby explicitly incorporated into the present disclosure.

According to a further disclosed embodiment of the method, after application of the anti-wear layer, an anti-corrosion layer can additionally be applied to portions of the base body that are not covered by the anti-wear layer. The anti-corrosion paints, zinc and powder coatings mentioned at the beginning, for example, can be used for this purpose.

Optionally, the anti-wear layer can thereby be overlapped in the angled region by the anti-corrosion layer, further to increase the corrosion resistance against damage to the adhesion of the anti-wear layer.

Suitable materials for the anti-wear layer are those which have a higher wear resistance, in particular, both a higher wear resistance and a higher corrosion resistance, compared to the material of the base body. The material for the anti-wear layer can be a non-oxide ceramic material and/or a metal or a metal alloy. In exemplary embodiments, a carbide, a boride, a nitride or mixtures thereof are used as the non-oxide ceramic material. Optionally, carbides, in particular, chromium carbide, tungsten carbide and mixtures containing them are used. Iron and iron alloys, for example, are suitable as the metal or metal alloy. Nickel, chromium and/or manganese, for example, can be used as alloying constituents.

The material of the anti-wear layer can be a powder. In particular, there can be produced from the powder an anti-wear layer in which the ceramic components are present as particles which are embedded in a metal alloy matrix.

The present disclosure relates to a further development of a laser powder deposition welding method for anti-wear friction surfaces 3 on brake discs 1 having a base body 2 of gray cast iron or steel and, associated therewith, a novel form of such brake discs 1.

The benefits of a deposition-welded anti-wear layer 3 as the friction surface with a correspondingly designed material system are high corrosion resistance at the heavily stressed friction surface, accompanied by high wear minimization, which leads to a long service life and high stability and additionally reduces the emission of abraded particles. Suitable material systems are described, without implying any limitation, in WO 2020/234144 A1 and WO 2021/008744 A, for example, and can be used in the present case.

The further development of the method is, however, explicitly not bound to a particular material system but includes all anti-wear layer materials which are suitable for laser deposition welding methods, because the aim in the present case is primarily to further develop the method to the benefit of corrosion protection.

It has been possible to demonstrate the outstanding braking power of anti-wear layer friction surfaces 3 in combination with tailored brake pads on test rigs. In addition, it has been possible to reduce considerably the wear of the brake disc 1 and of the brake pads compared to an uncoated brake disc made of the material of the base body 2.

Conventionally, in deposition welding, the supply of material takes place only at the friction surface. Without further measures, the inside and outside edge of the contact plane K between the anti-wear layer 3 and the substrate is exposed to the environment, so that a corrosive attack can occur directly at the interface between the anti-wear layer 3 and its substrate, whether that be the material of the base body 2 directly or an intermediate layer or an intermediate layer system for adhesion promotion, so that the anti-wear layer 3 can be partially detached by corrosion.

In the present case, this is addressed by continuing the anti-wear layer 3, which radially covers the edge of the contact plane K, whereby the location of a possible corrosive attack is moved away from the contact plane K.

The applied anti-wear layer 3 can be applied, for example, in spiral form. To that end, the brake disc 1 is set in rotation in the plane of its friction surface 3a. A radially displaceable welding head 10 having a powder nozzle and a coaxial laser beam travels, for example, from the innermost radius of the friction surface 3a of the brake disc 1 radially to the outermost radius and thus applies a coating in spiral form, the individual turns of which overlap.

The welding beam 11 of the welding head 10 can thereby in principle be oriented perpendicular to the friction surface. However, by inclining the welding head 10 by up to +/−45° relative to the perpendicular of the friction surface, optionally in the radial direction, back reflections of the laser beam from the workpiece into the optical beam path can better be avoided.

It is recommended to keep the distance of the welding head 10 from the workpiece surface as constant as possible to achieve good and especially uniform adhesion of the anti-wear layer 3.

In the case of brake discs 1 which at the edge of the friction surface 3a, radially inward and/or outward, have a chamfer 4 at the transition to a circumferential portion 5 perpendicular to the friction surface 3a, there would be a significant change in the distance between the nozzle of the welding head 10 and the workpiece surface, with unsatisfactory quality of the anti-wear layer 3, if the welding head were guided solely in a plane parallel to the friction surface 3a in the region of such a chamfer 4. Both the completeness of the anti-wear layer 3 and the adhesion would be impaired considerably in the region of the chamfer 4. The consequence would be an anti-wear layer at the chamfer ends which did not have full coverage, was incomplete and/or did not adhere. Liquid media such as water containing dissolved salts could penetrate the contact plane in this region and cause crevice corrosion or contact corrosion.

Because the material of the base body 2 of the brake disc 1 may be gray cast iron, the presence of an aqueous corrosive medium causes a very rapid corrosive action and rapid progress of corrosion, because the gray cast iron, as the "baser" alloy compared to the material of the anti-wear layer 3, is damaged by electrochemical erosion. Owing to the associated increase in volume as a result of the formation of iron oxide, the anti-wear layer 3 could be lifted and thus detached.

By contrast, according to the disclosed embodiments, owing to an anti-wear layer with good adhesion extending beyond the friction surface, corrosion protection at this particularly sensitive geometric location is ensured and cracking and/or detachment of the anti-wear layer 3 is prevented. The service life of the brake disc 1 is lengthened considerably by this arrangement.

To prevent cracking and/or incomplete application of the anti-wear layer 3, bonding of the anti-wear layer 3 and the completeness of the anti-wear layer at the chamfer 4 and optionally also at the circumferential portion 5 are to be ensured at all times in the process, and especially the starting and end regions of the process are to be well bonded. In principle, it should be noted that a corrosive attack can never be completely prevented. However, in this way, the corrosive attack should occur not directly at the friction surface 3a but at a significant distance therefrom, for example, at the boundary from the diminishing chamfer 4 to the external circumferential portion 5a and/or to the internal circumferential portion 5b of the brake disc 1.

In this way, a corrosive attack must first occur across the chamfer 4 and can affect the edge Ra or Rb of the contact plane K of the friction surface 3a only substantially later. A considerably delayed corrosive action at the friction surface 3a can thus be achieved. In other words, the corrosive attack no longer occurs linearly relative to the extent of the contact plane K of the friction surface, but at the setting angle of the chamfer 4 of, for example, 45° and at a significant distance from the contact plane displaced toward the base body 2, as can clearly be seen in FIGS. 2 to 8.

To that end, the anti-wear layer 3 is continued beyond the friction surface 3a and extends into the chamfers 4 and/or into the circumferential portions 5 or 5a and/or 5b. It is thereby ensured that the anti-wear layer 3 is bonded to the substrate at the chamfers 4 and the circumferential portions 5 or 5a and/or 5b without any gaps, and that coverage is complete without any missing areas.

As has been disclosed, the anti-wear layer 3 is applied completely and with good adhesion to the chamfers 4 and/or the circumferential portions 5 or 5a and/or 5b perpendicular to the friction surface, and can thereby diminish in a tapering style in terms of its thickness. Coating of the brake disc 1 continuously over its entire circumference is thereby avoided, since the material of the anti-wear layer 3 would be expensive and the outlay in terms of manufacture required therefor would be high.

Figure 9:
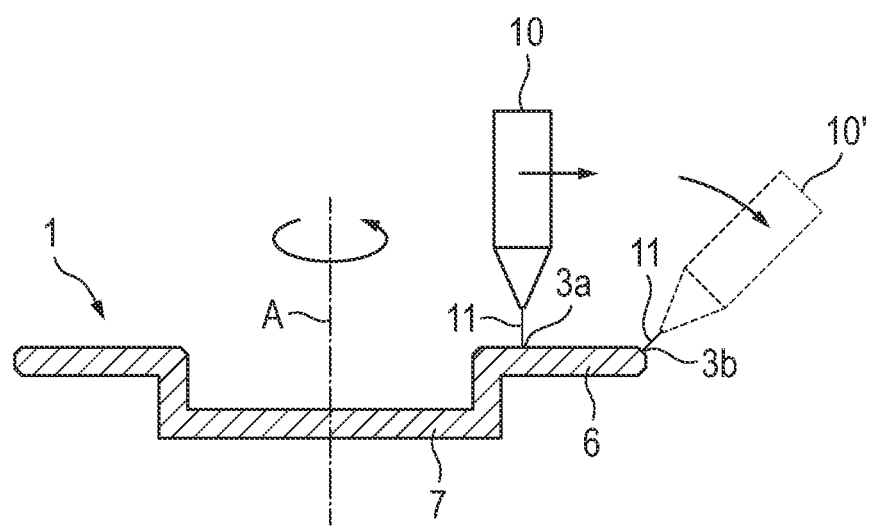
FIG. 9 is a diagram illustrating the production of the anti-wear layer.

For laser deposition welding at a chamfer 4 or a circumferential portion 5, it is provided to tilt the welding head 10 at the start and/or at the end of the process, as is shown in FIG. 9. The angular position of the welding head 10 is thereby controlled during the continuous application of the anti-wear layer 3 in spiral form. Both at the beginning of the deposition welding process and at the end thereof, the angular position and the height position of the welding head 10 are adapted to the position of the chamfer 4 and of the circumferential portion 5, in such a way that the working distance of the welding head 10 from the workpiece surface lies within a relatively narrow tolerance range, whereby a gap-free coating with complete coverage is achieved in those regions.

The brake disc 1 can, for example, be coated with an anti-wear layer 3 from the inside to the outside in a counter-clockwise process. Other possibilities arise on account of a coating strategy which travels from the outside to the inside. In addition, the direction of rotation of the brake disc 1 can be varied from a counter-clockwise process to a clockwise process, and the starting positions can be chosen from the outside or from the inside. Because the different coating strategies result in a complete coating on the friction surface, these variations are of secondary importance for the end result. However, in each of the coating strategies, the welding head 10 is tilted at the start and at the end of the welding process to apply the complete anti-wear layer 3 to the friction surface 3a and also to the chamfers 3 and/or circumferential portions 5 on either side of the friction surface in a single manufacturing operation.

The exemplary embodiments shown in FIGS. 1 to 8 can thereby be realized, without the present disclosure being limited to these embodiments.

As is shown in FIG. 1, a disclosed brake disc 1 for a friction brake of a transportation vehicle has a friction portion 6 having at least one planar friction surface 3a, in the present case, for example, two mutually opposite, annular friction surfaces, and also a fastening portion 7 for fastening to the transportation vehicle. In the present case, the fastening portion 8 is cup-shaped and is surrounded radially by the friction portion 6, but may also have a form other than that shown.

Both the friction portion 6 and the fastening portion 7 are formed on the base body 2 already mentioned above, which may be made of gray cast iron, but can also consist of steel.

On the friction portion 6 there is at least one friction surface 3a having an anti-wear layer 3 which has been applied by laser deposition welding. The anti-wear layer 3 may have been applied directly to the cast iron surface. The cast iron surface does not require any special preparation therefor.

The friction portion 6 can be formed of an annular disc on the opposite annular surfaces of which there is a friction surface 3a.

As has likewise already been mentioned, the anti-wear layer 3 on the base body 2 continues beyond the friction surface 3a into a region 3b that is angled relative to the friction surface 3a, where it ends, and is applied in the angled region 3b of the base body 2 with full coverage and without any gaps to the base body 2.

The angled region 3b encloses an angle greater than 0°, optionally from 15 to 95° and further optionally from 30° to 90°, with the friction surface 3a.

The region 3b that is angled relative to the friction surface 3a can be formed by the chamfers 4 already discussed above (see FIGS. 2, 3, 5 and 7). The circumferential portions 5 or 5a and 5b perpendicular to the friction surface 3a, which are adjacent to the chamfers 4, can also be attributed to the angled region 3b (see FIGS. 3 and 5). In the absence of the chamfers 4, the angled region 3b can be formed by the circumferential portions 5 or 5a and 5b perpendicular to the friction surface 3a (see FIGS. 4 and 6).

The anti-wear layer 3 is in such a form that it ends in the angled region 3b. If opposite anti-wear layers 3 are provided, they are not connected together.

At the friction surface 3a there is a contact plane K between the anti-wear layer 3 and the substrate on the base body side. In all exemplary embodiments of FIGS. 1 to 8, the anti-wear layer 3 continuing into the angled region 3b seals the edge Ra, Rb of that contact plane K with respect to the environment. The contact point of the anti-wear layer 3 that is exposed to the environment is thus at a distance from the contact plane K to the side of the base body 2.

Figure 2:
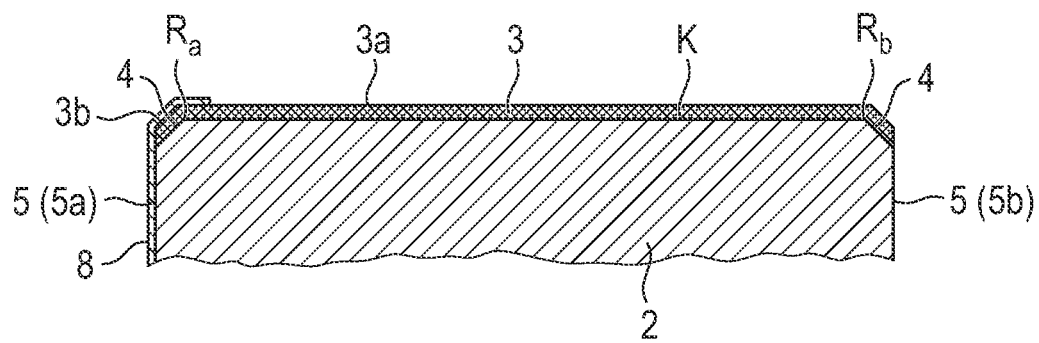
FIG. 2 is a detail view of the friction surface and of an angled region adjacent thereto of the exemplary embodiment of FIG. 1.

In the exemplary embodiment shown in FIG. 2, the friction surface 3a merges by way of a chamfer 4 into a circumferential portion 5 perpendicular to the friction surface 3a. The anti-wear layer 3, starting from the friction surface 3a, continues uninterruptedly into the chamfer 4 and ends radially flush with the circumferential portion 5.

The layer thickness of the anti-wear layer 3 thereby remains approximately constant, wherein the layer thickness is in each case measured perpendicular to the respective substrate. However, the layer thickness of the anti-wear layer can also vary slightly. Thus, the layer thickness in the angled region 3b can be approximately from 80 to 120% of the layer thickness at the friction surface 3a, in each case measured perpendicular to the respective substrate.

The layer thickness of the anti-wear layer 3 at the friction surface 3a is from 10 μm to 500 μm, optionally from 50 μm to 200 μm.

Figure 3:
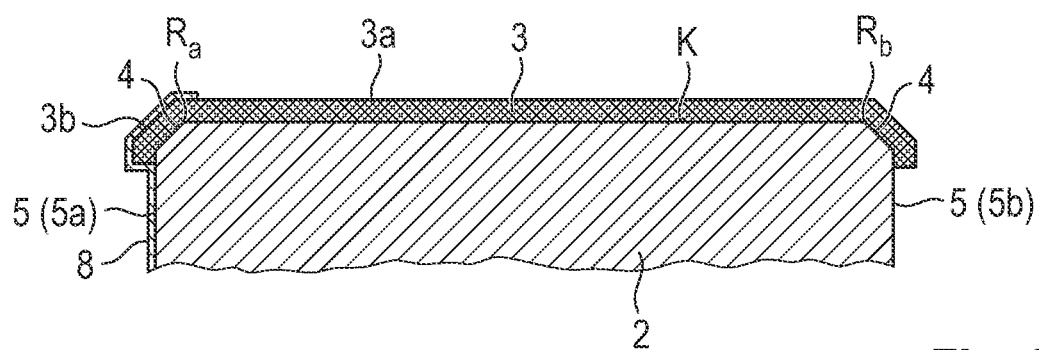
FIG. 3 is a detail view of the friction surface and of an angled region adjacent thereto analogous to FIG. 2 for a modified second exemplary embodiment.

FIG. 3 shows as a second exemplary embodiment a modification of FIG. 2 with an increased layer thickness of the anti-wear layer 3. In addition, in contrast to FIG. 2, the anti-wear layer can be continued beyond the chamfer 4 into the region of the circumferential portion 5, whereby the path for corrosion through to the contact plane K is further increased.

Figure 4:
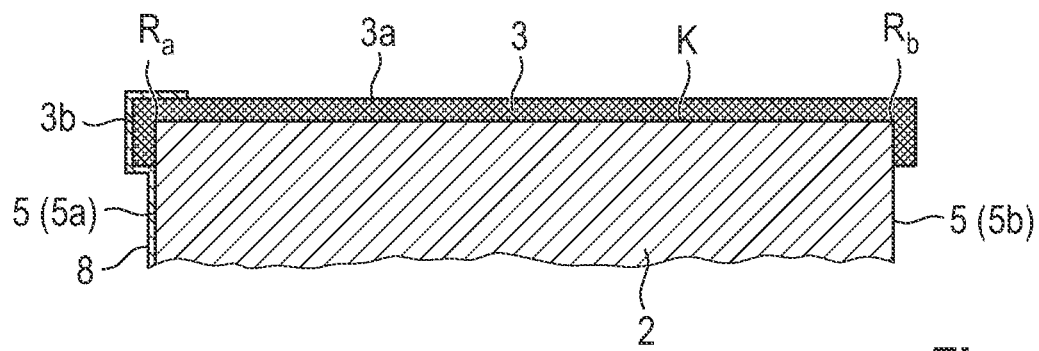
FIG. 4 is a detail view of the friction surface and of an angled region adjacent thereto analogous to FIG. 2 for a modified third exemplary embodiment.

FIG. 4 shows as a third exemplary embodiment a modification of FIGS. 2 and 3, in which there is no chamfer 4 at the edges of the friction surface 3a. In this case, the friction surface 3a merges directly into the circumferential portion 5 perpendicular to the friction surface 3a. The anti-wear layer 3 again continues, starting from the friction surface 3a, uninterruptedly into the circumferential portion 5. Here too, the edge Ra, Rb of the contact plane K is covered and sealed by the anti-wear layer 3 in the angled region 3b. The layer thickness of the anti-wear layer 3 remains approximately constant, wherein it is in each case measured perpendicular to the respective substrate and wherein deviations in the above-mentioned range of from 80 to 120% are again possible.

Figure 5:
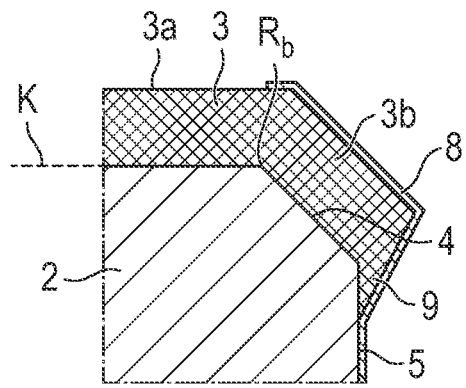
FIG. 5 is a detail view of the friction surface and of an angled region adjacent thereto analogous to FIG. 2 for a modified fourth exemplary embodiment.

FIG. 5 shows as a fourth exemplary embodiment a variation of the second exemplary embodiment according to FIG. 3. The anti-wear layer 3 here has in the angled region 3b an edge portion in which the layer thickness tapers to the edge of the anti-wear layer 3. The tapering 9 concerns only the region that covers the circumferential portion 5 but, in a modification thereof, can already start in the region of the chamfer 4, but not in the region of the friction surface 3a.

Figure 6:
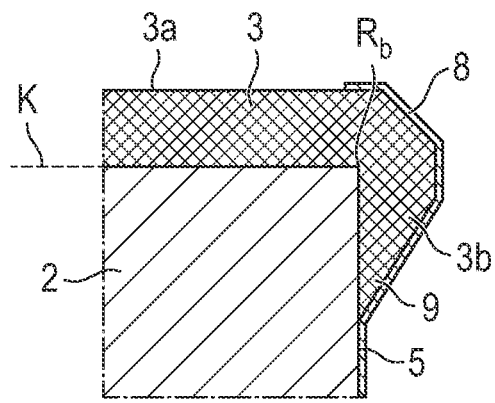
FIG. 6 is a detail view of the friction surface and of an angled region adjacent thereto analogous to FIG. 2 for a modified fifth exemplary embodiment.

FIG. 6 shows as a fifth exemplary embodiment a variation of the third exemplary embodiment according to FIG. 4. As in FIG. 5, the anti-wear layer 3 again has in the angled region 3b an edge portion in which the layer thickness tapers to the edge of the anti-wear layer 3. In the absence of a chamfer 4, the tapering 9 extends to the edge of the anti-wear layer 3 at the circumferential portion 5.

Figure 7:
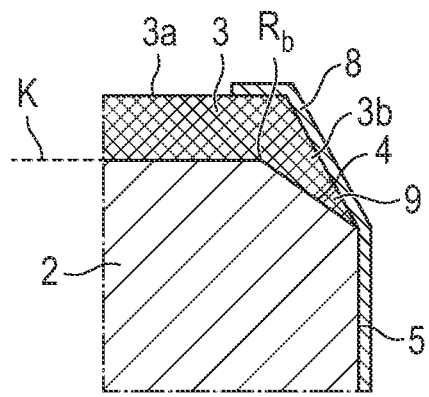
FIG. 7 is a detail view of the friction surface and of an angled region adjacent thereto analogous to FIG. 2 for a modified sixth exemplary embodiment.

FIG. 7 shows as a sixth exemplary embodiment a tapering 9 of the anti-wear layer 3 in the region of the chamfer 4.

FIG. 7 further shows the additional application of an anti-corrosion layer 8. This anti-corrosion layer 8 consists of a paint, a zinc or powder coating without the requirement for high wear resistance for a friction surface 3a and is considerably less expensive than the anti-wear layer 3. There may be mentioned as an example, inter alia, a water- or solvent-based zinc flake coating, which can be applied by spraying. The anti-corrosion layer 8 is applied to surface portions outside of the friction surface 3a. It can additionally overlap the anti-wear layer 3 in the angled region 3b to delay a corrosive attack at the interface between the anti-wear layer 3 and the substrate thereof and thereby further increase the service life of the brake disc 1.

Such an overlapping by an anti-corrosion layer 8 can also be provided in the exemplary embodiments according to FIGS. 1 to 6. In FIGS. 2 to 4, this is illustrated by way of example in each case for the outside edge of the brake disc 1, but can optionally also be provided at the inside edge and any other edge locations. The overlapping can remain limited to selected edge regions of the anti-wear layer 3 or can cover the entire edge region of the anti-wear layer 3.

In the exemplary embodiments explained above, the anti-wear layer 3 is bonded directly to the material of the base body 2 by substance-to-substance bonding by laser deposition welding. The added material for the anti-wear layer 3 is thereby melted into the material of the base body 2, because the base body is melted slightly during the laser deposition welding, and does not simply adhere in a welding bead to the surface, as is conventionally the case in thermal spraying methods. Ultimately, this permits a single-layer structure of the wear protection directly on the material of the base body 2 with sufficient bonding.

Figure 8:
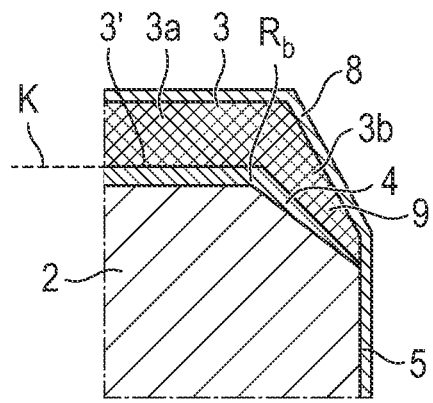
FIG. 8 is a detail view of the friction surface and of an angled region adjacent thereto analogous to FIG. 2 for a modified seventh exemplary embodiment.

It is, however, also possible to provide a multi-layer structure for the wear protection, in that, as is shown by way of example in FIG. 8, the anti-wear layer 3 is applied to at least one intermediate layer 3' by laser deposition welding. The intermediate layer 3' is in turn bonded to the material of the base body 2 by substance-to-substance bonding by laser deposition welding. Such a multi-layer structure can be used analogously in the exemplary embodiments shown in FIGS. 2 to 7.

The intermediate layer 3' may be slightly more ductile than the anti-wear layer 3. An iron-based alloy, for example, can be used for the intermediate layer 3'. Hard particles, in particular, carbides, boride and/or nitrides, are additionally contained in the anti-wear layer 3.

FIG. 9 shows a diagram to illustrate a method for producing a brake disc 1 having an anti-wear layer 3 as explained above.

The method first comprises providing the base body 2, which may be produced from gray cast iron, but can also consist of steel. The base body 2 extends over the friction portion 6 having at least one friction surface 3a and over a fastening portion 7 for fastening to the transportation vehicle. The friction portion 6 and the fastening portion 7 may be formed integrally, that is to say in one piece with one another.

The base body 2, optionally after the production of further functional surfaces, is introduced into a device for laser deposition welding, as shown in FIG. 9. In such a device, the anti-wear layer 3 is then applied by laser deposition welding by a welding head 10, wherein the welding beam 11 of the welding head 10 is guided over the respective workpiece surface on the base body 2.

In a disclosed embodiment, the brake disc 1 is to that end rotated in the plane of the friction surface 3a, in the present case about the axis. A perpendicular to the brake disc 1. In addition, the welding head 10 is moved radially relative to the brake disc 1. The cooperation of both movements produces a welding bead of spiral form, the adjacent turns of which overlap by approximately from 70 to 95%.

On reaching an edge Ra, Rb of the friction surface 3a, the welding beam 11 of the welding head 10 is tilted, as is indicated in FIG. 9 at reference sign 10', to continue the deposition welding beyond the friction surface 3a in the region 3b of the brake disc 1 that is angled relative to the friction surface 3a, in such a way that the welding head 10 continues to be moved at a constant distance over the surface of the workpiece, here specifically travels over the angled region 3b.

The welding beam 11 can thereby be oriented substantially perpendicular to the workpiece surface. It is possible to deviate from a strictly perpendicular orientation of the welding beam 11 by approximately +/−45° without impairing the quality of the anti-wear layer 3.

The welding operation is continued in a continuous style beyond the friction surface 3a, that is to say does not have to be interrupted for the angled region 3b. The distance of the welding head 10 from the workpiece surface thereby remains constant throughout.

If angled regions 3b are to be traveled over at both edges Ra, Rb of the friction surface 3a, welding may be started at one of the angled regions 3b and is then carried out continuously to the other angled region 3b.

In laser deposition welding, the hard layer 3 is bonded to its substrate by substance-to-substance bonding. The material of the substrate is thereby melted slightly by a laser beam, and at the same time the material for the anti-wear layer 3 is introduced, optionally as a powder.

Optionally, for a multi-layer structure, an intermediate layer 3' can first be bonded to the material of the base body 2 by substance-to-substance bonding by laser deposition welding. The anti-wear layer 3 is then welded onto this intermediate layer 3' or a plurality of such intermediate layers.

The anti-wear layer 3 is in principle ready for use after the deposition welding, but it can optionally also be subjected to a smoothing process.

Furthermore, in an exemplary embodiment of the method, after the anti-wear layer 3 has been applied, an anti-corrosion layer 8 can be applied to portions of the base body 2 that are not covered by the anti-wear layer 3. Less resistant and significantly less expensive coatings which do not have to be welded are conventionally used here.

For manufacturing reasons, the anti-corrosion layer 8 may not only be applied to the portions of the base body 2 that are not covered by the anti-wear layer 3, but will also cover the anti-wear layer 3. On the friction surface 3a, such an anti-corrosion layer 8 is worn away within a few braking operations, so that this region is ultimately left out in operation of the brake disc or can also be left out during coating. However, the anti-wear layer 3 in the angled region 3b can be or remain overlapped by the anti-corrosion layer 8 to delay a corrosive attack at the interface between the anti-wear layer 3 and the substrate thereof and thus to further improve the service life of the anti-wear layer 3 and the brake disc 1. The overlap can reach as far as the friction surface 3a, that is to say as far as those regions which ultimately come into frictional engagement with the brake shoes of the friction brake.

The benefit of this procedure is that there is no longer a gap between the anti-wear layer 3 applied by laser deposition welding and the base body 2, or such a gap can no longer form, but instead there is good coverage and good adhesion of the anti-wear layer 3 applied by deposition welding even in the angled region 3b adjoining the friction surface 3a, in particular the chamfers 4 and optionally the circumferential portions 5. Corrosion formation in regions of the brake disc 1 that are particularly relevant for its functioning is thus reduced and delamination of the anti-wear coating 3 is prevented. By using an additional anti-corrosion layer 8, corrosive attack in the direction towards the friction surface 3a can be further delayed.

The disclosure has been explained in detail above by exemplary embodiments and further modifications. In particular, individual technical features which have been explained above in the context of further individual features can be implemented independently of those individual features and also in combination with further individual features, even if this is not explicitly described, as long as this is technically possible. The disclosure is, therefore, explicitly not limited to the described exemplary embodiments and modifications, but includes all embodiments defined by the patent claims.

LIST OF REFERENCE SIGNS 1 brake disc
2 base body
3 anti-wear layer
3 intermediate layer
3a friction surface
3b angled region
4 chamfer
5 circumferential portion
5a outer circumferential portion
5b inner circumferential portion
6 friction portion
7 fastening portion
8 anti-corrosion layer
9 tapering
10 welding head
10' welding head, tilted
11 welding beam
A axis of rotation
K contact plane
Ra (radially) outer edge of the friction surface 3a
Rb (radially) inner edge of the friction surface 3a

The invention claimed is:

1. A brake disc for a friction brake of a transportation vehicle, the brake disc comprising:
a friction portion having at least one friction surface;
a fastening portion for fastening to the transportation vehicle;
a based body composed of gray cast iron or steel, wherein the friction portion and the fastening portion are formed on the base body of gray cast iron or steel;
an anti-wear layer applied to the friction portion as the at least one friction surface, wherein the anti-wear layer is applied by laser deposition welding, wherein the anti-wear layer on the base body is applied beyond the friction surface into a region angled relative to the friction surface ending in that region, and wherein the anti-wear layer is applied in the angled region of the base body with full coverage without any gaps to the base body; and
a contact plane at the friction surface between the anti-wear layer and a substrate thereof on the base body side, wherein the anti-wear layer continues into the angled region and seals the edge of that contact plane.

2. The brake disc of claim 1, wherein the angled region is defined by a chamfer and/or a circumferential portion perpendicular to the friction surface, wherein the friction surface merges directly or by the chamfer into the circumferential portion perpendicular to the friction surface, and the anti-wear layer, starting from the friction surface, is continued uninterruptedly into the chamfer or into the circumferential portion.

3. The brake disc of claim 1, wherein the layer thickness of the anti-wear layer in the angled region is from 80% to 120% of the layer thickness of the friction surface, in each case measured perpendicular to a respective substrate.

4. The brake disc of claim 1, wherein the anti-wear layer has an edge portion in the angled region, wherein the layer thickness of the edge portion tapers to the edge of the anti-wear layer.

5. The brake disc of claim 1, wherein an anti-corrosion layer is provided which extends over the anti-wear layer at least in the angled region and further over surface portions of the brake disc outside of the anti-wear layer.

6. The brake disc of claim 1, wherein the anti-wear layer is bonded directly to the material of the base body by substance-to-substance bonding, or wherein the anti-wear layer is applied to an intermediate layer, which in turn is bonded to the material of the base body by substance-to-substance bonding by laser deposition welding.

7. A method for producing a brake disc for a friction brake of a transportation vehicle, the method comprising:
providing a base body of gray cast iron or steel, wherein a friction portion having at least one friction surface and a fastening portion for fastening to the transportation vehicle are formed thereon;
applying an anti-wear layer at least in the region of the friction surface of the friction portion as the at least one friction surface by laser deposition welding by using a welding head,
wherein, on reaching an edge of the friction surface, the laser deposition welding is continued beyond the friction surface into a region of the brake disc that is angled relative to the friction surface, and
wherein a contact plane is formed at the friction surface between the anti-wear layer and a substrate thereof on the base body side, wherein the anti-wear layer continues into the angled region and seals the edge of that contact plane.

8. The method of claim 7, wherein the brake disc is rotated in the plane of the friction surface during the deposition welding and the welding head is moved radially relative to the brake disc and the welding head is tilted in response to reaching the edge of the friction surface.

9. The method of claim 7, wherein, after application of the anti-wear layer, an anti-corrosion layer is applied to portions of the base body that are not covered by the anti-wear layer, wherein the anti-wear layer is overlapped in the angled region by the anti-corrosion layer.

10. The method of claim 7, wherein the angled region is defined by a chamfer and/or a circumferential portion perpendicular to the friction surface, wherein the friction surface merges directly or by the chamfer into the circumferential portion perpendicular to the friction surface, and the anti-wear layer, starting from the friction surface, is continued uninterruptedly into the chamfer or into the circumferential portion.

11. The method of claim 7, wherein the layer thickness of the anti-wear layer in the angled region is from 80% to 120% of the layer thickness of the friction surface, in each case measured perpendicular to a respective substrate.

12. The method of claim 7, wherein the anti-wear layer has an edge portion in the angled region, wherein the layer thickness of the edge portion tapers to the edge of the anti-wear layer.

13. The method of claim 7, wherein an anti-corrosion layer is provided which extends over the anti-wear layer at least in the angled region and further over surface portions of the brake disc outside of the anti-wear layer.

14. The method of claim 7, wherein the anti-wear layer is bonded directly to the material of the base body by substance-to-substance bonding, or wherein the anti-wear layer is applied to an intermediate layer, which in turn is bonded to the material of the base body by substance-to-substance bonding by laser deposition welding.

\* \* \* \* \*